Nov. 30, 1943.    M. C. HERGET    2,335,828

FASTENER

Filed Sept. 5, 1941

INVENTOR
Marvin C. Herget
BY
Bean, Brooks, Buckley & Bean.
ATTORNEYS

Patented Nov. 30, 1943

2,335,828

UNITED STATES PATENT OFFICE 2,335,828

FASTENER

Marvin C. Herget, Williamsville, N. Y., assignor to Bell Aircraft Corporation, Buffalo, N. Y.

Application September 5, 1941, Serial No. 409,694

3 Claims. (Cl. 24—221)

This invention relates to fasteners, and more particularly to a new and improved device for quickly and detachably fastening separate elements such as sheet metal elements in connection with airplane cowling, or the like.

One object of the invention is to provide a device of the character described having two cooperating members adapted to be brought into and out of locked relation in an improved manner. Other objects and advantages of the invention will appear in the specification hereinafter.

The invention is illustrated in conjunction with upper and lower sheet metal members 10 and 12, respectively. The lower sheet member 12 is illustrated as carrying one of the cooperating portions of the fastening device which will be hereinafter referred to generally as the nut or cylindrical retainer 14, and it will be noted that the sheet metal member 12 is annularly apertured at 16 so as to receive the upper end portion of the nut or cylindrical retainer 14. The nut or cylindrical retainer 14 is riveted upon the sheet 12 at its remote upper end portion as indicated at 18, and thus the nut is rigidly mounted upon the sheet.

Figure 1:
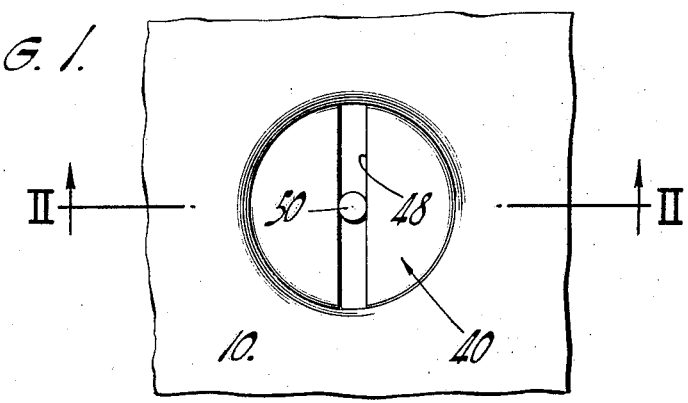
Fig. 1 is a top plan of a fastener of the invention mounted upon sheet metal structure.
Figure 2:
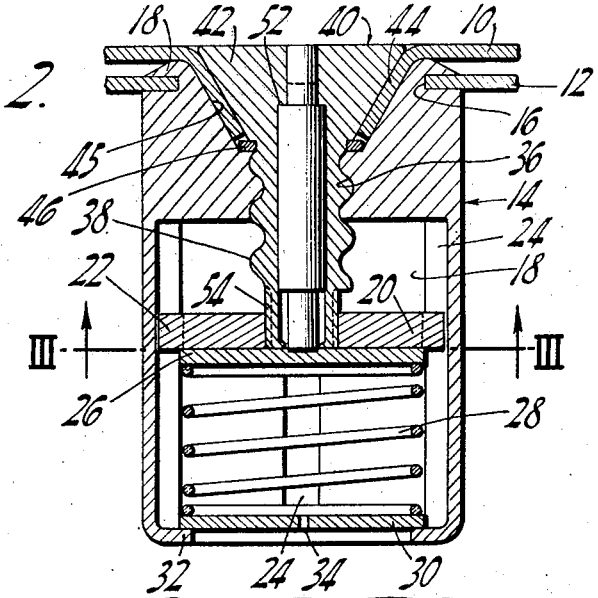
Fig. 2 is a section taken substantially along line II—II of Fig. 1, showing cooperative portions of the fastener device locked in interengaged condition.
Figure 3:
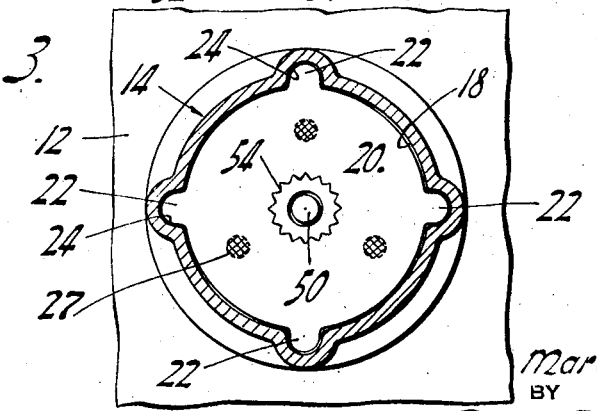
Fig. 3 is a section taken substantially along line III—III of Fig. 2.

The lower portion of the body of the nut 14 is bored as at 18 to form an axially extending chamber to receive in vertically slidable relation therein a locking disc 20 which is formed with a plurality of spaced radially extending ears 22 for splined connection with corresponding vertically grooved portions 24 of the nut or cylindrical retainer 14. Thus, the locking disc 20 is free to float vertically within the body of the nut 14 but is prevented from rotating therewithin by reason of the spline connection referred to. A bearing plate 26 is disposed to abut against the bottom face of the locking disc 20; and is integrally attached thereto, as by welding, see the spot-welds designated 27 in Fig. 3; and a compression spring 28 is arranged to bear at one of its ends upwardly against the bearing plate 26 and downwardly at its other end against an anchor plate 30. The anchor plate 30 is so proportioned and arranged as to be retained within the body of the nut 14 by a turned flange portion 32 which is formed at the extreme lower end of the body of the nut 14.

The anchor plate 30 is apertured at 34 so as to provide an air vent device whereby the bearing plate and locking disc assembly may be free to move vertically within the body of the nut 14 without interference from pneumatic pressure forces. The upper portion of the body of the nut 14 is centrally bored and tapped as indicated at 36 for screwthreaded engagement with a threaded shank portion 38 of the screw member 40 of the device. The screw member 40 is formed with a head portion of conical shape at its under surface so as to be adapted to engage in snug fitting relation within a tapered or countersunk type portion 44 of the sheet member 10.

The upper face portion of the nut 14 is countersunk as at 45 so as to complement the tapered form of the sheet metal portion 44 when brought into engagement therewith. Thus, the screw 40 is adapted to be inserted through the sheet metal member 10 in such manner as to have the head portion 42 thereof disposed in flush relation within the countersunk portion 44 of the sheet member 10; and when in this position the screw 40 is adapted to be screwed into the threaded portion 36 of the nut 14 so as to bring the sheet members 10—12 into firmly fixed relation. A split spring washer 46 is applied to the upper shank portion of the screw 40 subsequent to assembly of the screw upon the sheet 10 so as to prevent accidental displacement of the screw from the sheet without interfering with rotation of the screw within the sheet.

The outer face of the screw 40 is diametrically slotted as at 48 for engagement therewith by the blade of a screwdriver or the like, and the screw 40 is centrally bored so as to be adapted to carry therewith a control pin 50 in telescopic relation therewithin. The control pin 50 and the screw 40 are shouldered as at 52 so as to prevent displacement of the pin 50 outwardly of the screw 40 beyond a flush-end position and at its opposite end the bore of the screw 40 is reduced in diameter to prevent disassembly of the screw and pin. The pin 50 and the screw 40 are of substantially equal length, and thus the pin is arranged to bear at its lower end against the bearing plate 26, and is normally maintained by the action of the spring 28 in raised or end-flush position with respect to the upper face of the screw 40. However, it will be understood that upon insertion of a screwdriver or other suitable tool within the slotted portion 48 of the screw head, the tool will press the pin 50 downwardly against the action of the spring 28 so as to press the bearing plate 26 and locking disc 20 downwardly for a distance equal to the depth of the screwdriver slot 48.

The locking plate is centrally bored and vertically grooved to provide a spline connection at 54 with the similarly serrated lower end portion of the screw shank. Thus, the locking plate 20 is adapted to normally lock the screw 40 against rotation when the screw and nut members are in engaging position, but as the bearing plate 26 moves in response to screwdriver pressure as explained hereinabove and pulls the locking disc 20 downwardly therewith away from geared relation with respect to the threaded portion 54 of the screw 40, the screw 40 is thereby freed to be rotated by the operator of the screwdriver for threading of the screw relative to the nut 14. Upon subsequent release of screwdriver pressure from the upper end of the pin 50, the spring 28 will immediately raise the pin and the locking disc 20 into locking engagement with respect to the screw spline portion 54, whereby the device will again be automatically locked.

Thus, it will be understood that the fastener of the invention includes a nut and a screw member arranged to be separately fastened to sheet metal elements or the like in such manner that the nut member is rigidly mounted while the screw member is freely rotatable upon its mounting element. The nut member carries a locking plate which is slidable axially of the direction of screw threading relative movement between the screw member and the nut member, but it is fixed against rotation about said axis. The locking plate is centrally bored and serrated to engage the similarly serrated shank end of the screw member when brought into registry therewith. Elastic force means are arranged to normally urge the locking plate to move into locking engagement with respect to the screw member whenever the screw member is engaged in screwthreaded relation upon the nut member. The screw member includes a telescopically carried key pin which is adapted to be depressed to carry the locking plate against the action of the elastic force means away from locking engagement with respect to the screw member; and the key pin is so arranged as to be automatically so depressed upon insertion of a screwdriver blade into the slotted head portion of the screw member.

Consequently, subsequent to respective assemblies of the screw and nut members upon the elements to be fastened, the threaded shank portion of the screw member may be brought into registry with the tapped bore of the nut member and screwed thereinto by means of an ordinary screwdriver or similar tool. Throughout this operation the driving tool maintains the key pin in anti-locking position. Thus, the mounting elements are accurately centered and forcibly carried into firmly interconnected position simply by means of a few turns of the screwdriver tool. Then, immediately upon withdrawal of the screwdriver, the locking plate moves to spline connection position with respect to the screw member so as to automatically lock the latter against accidental displacement therefrom. To disconnect the fastener device, the screwdriver tool is simply inserted into the screw head slot whereupon the key pin automatically unlocks the screw spline connection, and the screw member may then be withdrawn from the nut member by a few simple turns of the screwdriver tool. Thus, a particularly positive and otherwise advantageous form of self-locking and self-unlocking fastener device is provided, and it will be understood that although only one form of the invention has been shown and described in detail it will be apparent to those skilled in the art that the invention is not so limited but that various changes may be made therein without departing from the spirit of the invention or the scope of the appended claims.

I claim:

1. A screw fastener comprising a cylindrical retainer having a tapped opening in an end wall thereof and an enlarged axially extending chamber adjacent said tapped opening, a headed screw for engagement in said tapped opening and having a reduced spline portion at its end opposite the headed end, disc means in said chamber having a blind axial recess therein with a spline formation for receiving the splined end of said screw to secure the two elements against relative rotation, peripheral formations on said disc and complementary longitudinally extending formations in said chamber whereby said disc may move axially in said chamber to and from spline-engaging position, said screw having an axial bore with reduced openings at the opposite ends of said screw, a pin in said bore, said pin having reduced end portions for axial movement in said reduced openings, the medial portion of said pin preventing disassembly of said screw and pin, spring means normally urging said disc toward said screw, the end of said pin adjacent said spline formation being adapted to engage in said blind recess to move said disc to disengaged position by pressure against the other end of said pin.

2. A screw fastener comprising a cylindrical retainer having a tapped opening in an end wall thereof and an enlarged axially extending chamber adjacent said tapped opening, a screw for engagement in said tapped opening and having a slotted head at one end and a reduced spline portion at its end opposite, disc means in said chamber having a blind axial recess therein with a spline formation for receiving the splined end of said screw to secure the two elements against relative rotation, peripheral formations on said disc and complementary longitudinally extending formations in said chamber whereby said disc may move axially in said chamber to and from spline-engaging position, said screw having an axial bore with reduced openings at the opposite ends of said screw, a pin in said bore, said pin having reduced end portions for axial movement in said reduced openings, the medial portion of said pin preventing disassembly of said screw and pin, spring means normally urging said disc toward said screw, the end of said pin adjacent said spline formation being adapted to engage in said blind recess to move said disc to disengaged position, the other end of said pin being normally yieldably disposed in the slot in said head whereby the insertion of screw driving means in said slot disengages said spline connection.

3. A screw fastener comprising a cylindrical retainer having a tapped opening in an end wall thereof and an enlarged axially extending chamber adjacent said tapped opening, a headed screw for engagement in said tapped opening and having a reduced spline portion at its end opposite the headed end, disc means in said chamber having a blind axial recess therein with a spline formation for receiving the splined end of said screw to secure the two elements against relative rotation, peripheral formations on said disc and complementary longitudinally extending formations in said chamber whereby said disc may move axially in said chamber to and from spline-engaging position, said screw having an axial bore with reduced openings at the opposite end of said screw, a pin in said bore, said pin having reduced end portions for axial movement in said reduced openings to provide for limited axial movement of said pin in said bore, the medial portion of said pin preventing disassembly of said screw and pin, spring means normally urging said disc toward said screw, the end of said pin adjacent said spline formation being adapted to engage in said blind recess to move said disc to disengaged position by pressure against the other end of said pin, the latter being normally resiliently disposed in a position for engagement by a screw head engaging tool to be moved thereby to release said spline connection preliminary to a screw turning operation.

MARVIN C. HERGET.